United States Patent
Sawaguchi et al.

(10) Patent No.: US 7,501,465 B2
(45) Date of Patent: Mar. 10, 2009

(54) RESIN COMPOSITION

(75) Inventors: Taichi Sawaguchi, Tokyo (JP); Koji Minami, Tokyo (JP)

(73) Assignee: Zeon Corporation, Tokyo (JP)

(*) Notice: Subject to any disclaimer, the term of this patent is extended or adjusted under 35 U.S.C. 154(b) by 259 days.

(21) Appl. No.: 10/587,393

(22) PCT Filed: Jan. 17, 2005

(86) PCT No.: PCT/JP2005/000492

§ 371 (c)(1),
(2), (4) Date: Jul. 27, 2006

(87) PCT Pub. No.: WO2005/073321

PCT Pub. Date: Aug. 11, 2005

(65) Prior Publication Data

US 2007/0158623 A1   Jul. 12, 2007

(30) Foreign Application Priority Data

Jan. 30, 2004   (JP) .............................. 2004-024905

(51) Int. Cl.
*C08K 5/20* (2006.01)
(52) U.S. Cl. ..................... 524/230; 524/553; 524/572; 524/574
(58) Field of Classification Search ................ 524/230, 524/553, 572, 574
See application file for complete search history.

(56) References Cited

U.S. PATENT DOCUMENTS

| | | | | |
|---|---|---|---|---|
| 5,731,376 A | * | 3/1998 | Grasmeder | 524/451 |
| 6,015,854 A | * | 1/2000 | McCullough, Jr. | 524/396 |
| 6,815,488 B2 | * | 11/2004 | Nakamura | 524/444 |

FOREIGN PATENT DOCUMENTS

| | | |
|---|---|---|
| EP | 1 291 386 A1 | 3/2003 |
| EP | 1 310 513 A1 | 5/2003 |
| JP | 4-103626 (A) | 4/1992 |
| JP | 7-216152 (A) | 8/1995 |
| JP | 9-241484 (A) | 9/1997 |
| JP | 9-268250 (A) | 10/1997 |
| JP | 2000-144000 (A) | 5/2000 |
| JP | 2001-139756 (A) | 5/2001 |
| JP | 2003-276047 (A) | 9/2003 |

OTHER PUBLICATIONS

Lars C. Larsen, "Processing additives -A to Z", Rubber World, Dec. 1997, vol. 217, No. 3, pp. 22 to 24.

Kunio Mori et al., "Stearic Acid Amido kara Mita Bloom Riron no Mondaiten", Journal of the Society of Rubber Industry, Japan, vol. 70, No. 5, The Society of Rubber Industry, Japan, May 15, 1997, pp. 269 to 273.

International Search Report of PCT/JP2005/000492 date of mailing Mar. 29, 2005.

European Search Report dated Oct. 26, 2007 issued in corresponding European Application No. 05 70 3729.

* cited by examiner

*Primary Examiner*—Bernard Lipman
(74) *Attorney, Agent, or Firm*—Westerman, Hattori, Daniels & Adrian, LLP.

(57) ABSTRACT

A resin composition includes an alicyclic structure-containing polymer; a hindered amine compound; and a releasing agent, wherein the releasing agent and the alicyclic structure-containing polymer satisfy the following relationship: $10 \geq |s1-s2| \geq 0.8 \, [(MPa)^{0.5}]$, wherein s1 represents a solubility parameter of the releasing agent, and s2 represents a solubility parameter of the alicyclic structure-containing polymer. The resin composition can be used as optical materials, such as a lens, a diffraction grating, and a prism, especially in the field of using blue laser, and has excellent releasability, transparence and colorless property as well as excellent resistance to laser.

7 Claims, No Drawings

RESIN COMPOSITION

TECHNICAL FIELD

The present invention relates to a resin composition and a molded body obtained by molding the resin composition. More particularly, the present invention relates to a resin composition including an alicyclic structure-containing polymer, a hindered amine compound, and a releasing agent, and a molded body obtained by molding the resin composition.

BACKGROUND ART

An alicyclic structure-containing polymer, which is a resin having excellent transparency, is used in the production of optical parts, such as optical recording media, optical lenses, prisms, and light guide plates. The alicyclic structure-containing polymer, however, cannot solely exhibit satisfactory resistance to light, resistance to heat coloration, or releasability, and therefore attempts to incorporate various additives into the alicyclic structure-containing polymer are made to improve the above properties.

As resin compositions improved in the resistance to light, Japanese Patent Application Laid-open No. H7-216152 (Patent Document 1) discloses a resin composition comprising (1) a random copolymer of ethylene and a cyclic olefin or a ring-opening (co)polymerization product of a cyclic olefin, (2) a hindered amine compound, and (3) a resin compound composed of a lubricant such as polyhydric alcohol aliphatic ester, Japanese Patent Application Laid-open No. H9-268250 (Patent Document 2) discloses a resin composition comprising (1) a norbornene resin, (2) a hindered amine stabilizer for resistance to light, and (3) a lubricant, such as a partially etherified or esterified compound of polyhydric alcohol, and Japanese Patent Application Laid-open No. 2003-276047 (Patent Document 3) discloses a resin composition comprising (1) a vinyl alicyclic hydrocarbon polymer, (2) a hindered amine light stabilizer, and (3) a lubricant.

As a resin composition improved in the resistance to heat coloration, Japanese Patent Application Laid-open No. 2001-139756 (Patent Document 4) discloses a resin composition comprising (1) an alicyclic structure-containing polymer, (2) a hindered amine light stabilizer, and (3) a partially etherified or esterified compound of polyhydric alcohol.

As a resin composition improved in the releasability, Japanese Patent Application Laid-open No. H9-241484 (Patent Document 5) discloses a resin composition comprising (1) a norbornene polymer, (2) a hindered amine weathering stabilizer, and (3) a lubricant such as a partially etherified or esterified compound of polyhydric alcohol.

Patent Document 1: Japanese Patent Application Laid-open No. H7-216152
Patent Document 2: Japanese Patent Application Laid-open No. H9-268250
Patent Document 3: Japanese Patent Application Laid-open No. 2003-276047
Patent Document 4: Japanese Patent Application Laid-open No. 2001-139756
Patent Document 5: Japanese Patent Application Laid-open No. H9-241484

DISCLOSURE OF INVENTION

Problem To Be Solved By The Invention

Semiconductor laser having a short oscillation wavelength (blue laser having a wavelength of 350 to 530 nm) and light emitting diodes (LEDs) are being used in optical recording media and lighting, and therefore there are desired a lens, a diffraction grating, and a prism, which can be stably used around a short-wavelength light emitting material.

However, the resin compositions described in the Patent Documents 1 to 5 have only unsatisfactory releasability for molding and hence have low productivity, and a molded body obtained by molding the resin composition tends to be yellow, and the molded body has a resistance to normal light, but, when the molded body is irradiated with short-wavelength light, such as laser, white turbidity is caused in the molded body.

Accordingly, an object of the present invention is to provide a resin composition having excellent releasability and excellent transparence and colorless property as well as excellent resistance to laser.

Means for Solving Problem

The present inventors have made extensive and intensive studies with a view toward solving the above problems with respect to the composition of the resin composition including an alicyclic structure-containing polymer, a hindered amine compound, and a releasing agent. As a result, it has been found that, when using a releasing agent and an alicyclic structure-containing polymer respectively having a solubility parameter (s1) and a solubility parameter (s2) which satisfy a specific relationship, the above problems can be solved. The present invention has been completed, based on the above novel finding.

According to the present invention, a resin composition includes an alicyclic structure-containing polymer; a hindered amine compound; and a releasing agent, wherein the releasing agent and the alicyclic structure-containing polymer satisfy the following relationship: $10 \geq |s1-s2| \geq 0.8$ $[(MPa)^{0.5}]$, wherein s1 represents a solubility parameter of the releasing agent, and s2 represents a solubility parameter of the alicyclic structure-containing polymer.

In the resin composition according to the present invention, the alicyclic structure-containing polymer is obtained by hydrogenating an aromatic vinyl polymer, in which a content of an aromatic vinyl monomer unit is 50% by weight or more, or/and, preferably the ratio of the number of carbon-carbon double bonds to the total number of carbon-carbon bonds in the alicyclic structure-containing polymer is 0.15% or less, more preferably the hindered amine compound has (1) a molecular weight in the range of from 1,500 to 100,000, and (2) a light transmittance of 90% or more at a wavelength of 400 nm as measured using a 5% by weight of chloroform solution and a cell with an optical path of 10 mm, further preferably the releasing agent is a fatty acid amide releasing agent, and most preferably the resin composition has a light transmittance of 88% or more at a wavelength of 400 nm and an optical path length of 3 mm.

In addition, a molded body obtained by molding the resin composition according to the present invention is provided.

Effect Of The Invention

The resin composition according to the present invention has excellent releasability during molding and high mass-productivity. Further, the resin composition according to the present invention has excellent transparence and colorless property and excellent resistance to laser, and therefore can be advantageously used as an encapsulating material such as a semiconductor encapsulation or an optical semiconductor encapsulation, or an optical material such as optical lens, an optical fiber, or an optical disc, especially in the field of using a blue laser.

BEST MODE(S) FOR CARRYING OUT THE INVENTION

A resin composition according to the present invention includes an alicyclic structure-containing polymer, a hindered amine compound, and a releasing agent.

The alicyclic structure-containing polymer used in the present invention has an alicyclic structure in its any one of main chain and side chain or both, and preferably contains an alicyclic structure in the main chain from the viewpoint of achieving excellent mechanical strength and excellent resistance to heat, and preferably contains an alicyclic structure in the side chain from the viewpoint of achieving excellent resistance to oxidation under irradiation with laser.

Examples of alicyclic structures in the polymer include saturated cyclic hydrocarbon (cycloalkane) structures and unsaturated cyclic hydrocarbon (cycloalkene) structures. With respect to the number of carbon atoms constituting the alicyclic structure, there is no particular limitation, but, when the alicyclic structure generally has 4 to 30 carbon atoms, preferably 5 to 20 carbon atoms, more preferably 5 to 15 carbon atoms, an excellent balance between the properties of mechanical strength, resistance to heat, and moldability is advantageously achieved. The content of the repeating units having an alicyclic structure in the alicyclic structure-containing polymer can be appropriately selected depending on an intended use of the resin composition, but the content is preferably 50% by weight or more, more preferably 70% by weight or more, and particularly preferably 90% by weight or more.

Examples of alicyclic structure-containing polymers include norbornene polymers, addition polymerization products of monocyclic cycloalkene, and polymerization products of vinylcycloalkane.

Examples of norbornene polymers include ring-opening (co)polymerization products of a norbornene monomer and an optional monomer copolymerizable with the norbornene monomer; addition (co)polymerization products of a norbornene monomer and an optional monomer copolymerizable with the norbornene monomer; and hydrogenation products thereof.

Examples of addition polymerization products of monocyclic cycloalkene include addition (co)polymerization products of a monocyclic cycloalkene monomer and an optional monomer copolymerizable with the monocyclic cycloalkene monomer, addition (co)polymerization products of an alicyclic conjugated diene monomer and an optional monomer copolymerizable with the alicyclic conjugated diene monomer, and products obtained by optionally hydrogenating the unsaturated bond portion of the above polymer.

Examples of polymerization products of vinylcycloalkane include (co)polymers of vinylcycloalkane and an optional monomer copolymerizable with the vinylcycloalkane; hydrogenation products at the unsaturated bond portion of a (co) polymer of vinylcycloalkene and an optional monomer (excluding vinylcycloalkane) copolymerizable with the vinylcycloalkene; and hydrogenation products at the aromatic ring and olefin unsaturated bond portion of a (co)polymer of an aromatic vinyl monomer and an optional monomer copolymerizable with the aromatic vinyl monomer.

Of these, preferred are ring-opening (co)polymerization products of a norbornene monomer and hydrogenation products thereof, and polymerization products of vinylcycloalkane, more preferred are hydrogenation products at the aromatic ring and olefin unsaturated bond portion of a (co) polymer of an aromatic vinyl monomer and an optional monomer copolymerizable with the aromatic vinyl monomer, and especially preferred are hydrogenation products of an aromatic vinyl polymer having an aromatic vinyl monomer unit content of 50% by weight or more.

In the present invention, the norbornene monomer, monocyclic cycloalkene, alicyclic conjugated diene, vinylcycloalkane, and vinylcycloalkene are frequently referred to as "alicyclic structure-containing monomer".

Examples of alicyclic structure-containing monomers include norbornene monomers, such as bicyclo[2.2.1]hept-2-ene (trivial name: norbornene) and derivatives thereof, tricyclo[4.3.0.1$^{2,5}$]deca-3,7-diene (trivial name: dicyclopentadiene), tricyclo[4.3.0.1$^{2,5}$]deca-3-ene, tricyclo[4.4.0.1$^{2,5}$] undeca-3,7-diene, tricyclo[4.4.0.1$^{2,5}$]undeca-3,8-diene, tricyclo[4.4.0.1$^{2,5}$]undeca-3-ene, tetracyclo[7.4.0.1$^{10,13}$. 0$^{2,7}$]trideca-2,4,6-11-tetraene (another name: 1,4-methano-1,4,4a,9a-tetrahydrofluorene), tetracyclo[8.4.0.1$^{11,14}$.0$^{2,8}$] tetradeca-3,5,7,12~11-tetraene (another name: 1,4-methano-1,4,4a,5,10,10a-hexahydroanthracene), tetracyclo[4.4.0. 1$^{2,5}$.1$^{7,10}$]dodeca-3-ene (trivial name: tetracyclododecene), and derivatives thereof;

monocyclic cycloalkenes, such as cyclobutene, cyclopentene, cyclohexene, and 3,4-dimethylcyclopentene; alicyclic conjugated dienes, such as cyclopentadiene and cyclohexadiene; vinylcycloalkenes, such as vinylcyclopentene, 2-methyl-4-vinylcyclopentene, and vinylcyclohexene; and vinylcycloalkanes, such as vinylcyclopentane, 2-methyl-4-vinylcyclopentane, vinylcyclohexane, and vinylcyclooctane.

Examples of aromatic vinyl monomers include styrene, α-methylstyrene, divinylbenzene, vinylnaphthalene, and vinyltoluene.

The alicyclic structure-containing monomers and aromatic vinyl monomers can be used individually or in combination.

Examples of monomers addition-polymerizable with the alicyclic structure-containing monomer or aromatic vinyl monomer include linear olefins, such as ethylene, propylene, 1-butene, 1-pentene, 1-hexene, 3-methyl-1-butene, and 3-methyl-1-pentene; nonconjugated dienes, such as 1,4-hexadiene, 4-methyl-1,4-hexadiene, 5-methyl-1,4-hexadiene, and 1,7-octadiene; and conjugated dienes, such as 1,3-butadiene, 2-methyl-1,3-butadiene, and 1,3-hexadiene. These monomers can be used individually or in combination.

The alicyclic structure-containing polymer can contain a polar group, such as a hydroxyl group, a carboxyl group, an alkoxy group, an epoxy group, a glycidyl group, an oxycarbonyl group, a carbonyl group, an amide group, an ester group, or an acid anhydride group.

With respect to the polymerization method for the alicyclic structure-containing monomer or aromatic vinyl monomer and the hydrogen addition method which is optionally conducted for the resultant alicyclic structure-containing polymer, there is no particular limitation, and they can be conducted according to a known method.

The ring-opening (co)polymerization reaction of the norbornene monomer can be conducted using a ring-opening polymerization catalyst generally in a solvent at a temperature of −50 to 100° C. under a pressure of 0 to 5 MPa.

Examples of ring-opening polymerization catalysts include catalysts comprising a halide, nitrate, or acetylacetone compound of a metal, such as ruthenium, palladium, osmium, or platinum, and a reducing agent, and catalysts comprising a halide or acetylacetone compound of a metal, such as titanium, vanadium, zirconium, tungsten, or molybdenum, and a cocatalyst, such as an organoaluminum compound.

The addition (co)polymerization reaction of the norbornene monomer or monocyclic cycloalkene and a monomer copolymerizable therewith can be conducted using an addition polymerization catalyst generally at temperature of −50 to 100° C. under a pressure of 0 to 5 MPa.

Examples of addition polymerization catalysts include catalysts comprising a titanium, zirconium, or vanadium compound and a cocatalyst, such as an organoaluminum compound.

The polymerization reaction of the aromatic vinyl monomer, vinylcycloalkene, or vinylcycloalkane can be conducted by any of known methods of radical polymerization, anionic polymerization, and cationic polymerization, but the cationic polymerization is likely to cause the polymer to have a small molecular weight and the radical polymerization is likely to cause the polymer to have a broad molecular weight distribution, so that the resultant molded body has lowered mechanical strength, and hence the anionic polymerization is preferred. Further, any of suspension polymerization, solution polymerization, and bulk polymerization can be employed.

The anionic polymerization reaction of the aromatic vinyl monomer, vinylcycloalkene, or vinylcycloalkane can be conducted in an organic solvent using a polymerization catalyst at a reaction temperature of generally −70 to 150° C., preferably −50 to 120° C. for a reaction time of generally 0.01 to 20 hours, preferably 0.1 to 10 hours.

Examples of polymerization catalysts include organoalkali metals, such as n-butyllithium and 1,4-dilithiobutane, and a Lewis base, such as dibutyl ether or triethylamine, is preferably added since a polymer having a narrow molecular weight distribution can be obtained to surely achieve high mechanical strength or high resistance to heat.

Examples of the organic solvents include aliphatic hydrocarbons, such as n-pentane, n-hexane, and isooctane; alicyclic hydrocarbons, such as cyclopentane and cyclohexane; aromatic hydrocarbons, such as benzene and toluene; and ethers, such as tetrahydrofuran and dioxane.

The amount of the organic solvent used is preferably such an amount that the monomer concentration becomes 1 to 40% by weight, more preferably 10 to 30% by weight.

The polymer can be any of random and block copolymers, but it is preferably a random copolymer.

The polymer can be any of isotactic, syndiotactic, and atactic polymers.

The polymerization of the alicyclic conjugated diene can be conducted by a known method, for example, described in Japanese Patent Application Laid-open Nos. H6-136057 and H7-258318.

The polymerization conversion of the alicyclic structure-containing polymer is preferably 95% by weight or more, more preferably 97% by weight or more, and particularly preferably 99% by weight or more. The polymerization conversion is preferably higher since a molded body having a small amount of extricating organic substance can be obtained.

In the present invention, the polymerization conversion is a value obtained by subtracting the weight of the unreacted monomers from the weight of the monomers used and dividing the resultant value by the weight of the monomers used.

After the polymerization reaction, the alicyclic structure-containing polymer can be hydrogenated at carbon-carbon unsaturated bonds in its ring or main chain and side chain.

With respect to the alicyclic structure-containing polymer, the ratio of the number of carbon-carbon double bonds to the total number of carbon-carbon bonds in the polymer is preferably 0.15% or less, more preferably 0.07% or less, and particularly preferably 0.02% or less. The carbon-carbon double bond ratio is preferably smaller since a molded body having a small amount of extricating organic substance can be obtained.

In the hydrogenation reaction, the amount of the hydrogenation catalyst used, the reaction temperature, the hydrogen partial pressure, the reaction time, and the reaction solution concentration can be appropriately selected in respective suitable ranges depending on the type of the polymer to be hydrogenated.

With respect to the hydrogenation catalyst, there is no particular limitation, but preferred is a homogeneous catalyst comprised of a combination of a metal compound of nickel or cobalt and an organoaluminum or organolithium.

In the hydrogenation catalyst, if necessary, a carrier, such as activated carbon, diatomaceous earth, or magnesia, can be used.

It is preferred that the amount of the hydrogenation catalyst used is 0.01 to 50 parts by weight, relative to 100 parts by weight of the polymer, the reaction temperature is 25 to 300° C., the hydrogen partial pressure is 0.5 to 10 MPa, and the reaction time is 0.5 to 20 hours.

The hydrogenated alicyclic structure-containing polymer can be obtained by removing the hydrogen addition catalyst from the hydrogenation reaction solution by filtration and removing the solvent and others from the solution.

Examples of methods for removing the solvent and others include a solidification method and a direct drying method.

The solidification method is a method in which the polymer solution is mixed with a poor solvent of the polymer to permit the polymer to precipitate. The polymer in a small mass form (crumb) which has precipitated is subjected to solid-liquid separation, and the polymer is dried by heating to remove the solvent.

Examples of poor solvents include polar solvents, e.g., alcohols, such as ethyl alcohol, n-propyl alcohol, and isopropyl alcohol; ketones, such as acetone and methyl ethyl ketone; and esters, such as ethyl acetate and butyl acetate.

The direct drying method is a method in which the polymer solution is heated under a reduce pressure to remove the solvent, and can be conducted using a known apparatus, such as a centrifugal thin-film continuous evaporation dryer, a face heat exchange continuous reactor-type dryer, or a high-viscosity reactor apparatus. The degree of vacuum or temperature can be appropriately selected depending on the apparatus used.

It is preferred that the alicyclic structure-containing polymer has a volatile content of 0.5% by weight or less. When the volatile content of the alicyclic structure-containing polymer falls in this range, a molded body containing a small amount of volatile constituents, such as an extricating moisture or organic substance, can be advantageously obtained.

In the present invention, the volatile content is the amount of constituents which volatilize when being heated at 10° C./minute from 30° C. to 350° C. using a differential thermogravimeter (TG/DTA200 by Seiko Instruments Inc.).

With respect to the method for reducing the volatile constituents, there is no particular limitation, and examples include a method in which the solvent and the extricating moisture or organic substance are removed at the same time from the polymer solution by the above-mentioned solidification method or direct drying method, and a method using a steam stripping process, a vacuum stripping process, or a nitrogen stripping process. Among these, the solidification method and direct drying method are preferred since they are excellent in productivity.

It is preferred that the solvent is removed from the alicyclic structure-containing polymer by solidification or direct drying and then the resultant polymer is further dried by heating under a reduced pressure since a molded body having smaller amounts of extricating moisture and organic substance can be obtained.

The pressure for the drying is preferably 10 kPa or less, more preferably 3 kPa or less.

The heating temperature is preferably 260° C. or higher, more preferably 280° C. or higher.

The alicyclic structure-containing polymer preferably has a glass transition temperature (hereinafter, frequently referred to as "Tg", and indicates the higher or highest Tg with respect to the block copolymer having two or more Tg's) in the range of from 60 to 200° C., more preferably 70 to 180° C., and particularly preferably 90 to 160° C. The Tg in the above range is preferred from the viewpoint of achieving excellent resistance to heat and excellent processability.

In the present invention, the Tg is a value as measured using a differential scanning calorimeter.

With respect to the weight average molecular weight (Mw) of the alicyclic structure-containing polymer, there is no particular limitation, but, when the polymer is a block copolymer, the weight average molecular weight (Mw) is preferably in the range of from 50,000 to 300,000, more preferably 55,000 to 200,000, and particularly preferably 60,000 to 150,000. When the polymer is a random copolymer or homopolymer, the weight average molecular weight (Mw) is preferably in the range of from 5,000 to 500,000, more preferably 10,000 to 200,000. When the Mw falls in the above range, high mechanical strength can be achieved and the molding time can be reduced, and hence the polymer is unlikely to suffer heat decomposition, so that the amount of the extricating organic substance is advantageously lowered.

The alicyclic structure-containing polymer preferably has a molecular weight distribution (Mw/Mn)(ratio of the weight average molecular weight (Mw) to the number average molecular weight (Mn)) in the range of from 1 to 2, more preferably 1 to 1.5, and particularly preferably 1 to 1.2. When the Mw/Mn falls in the above range, an excellent balance between the mechanical strength and the resistance to heat is advantageously achieved.

The hindered amine compound used in the present invention contains a piperidine ring having a substituent bonded to the carbon atom adjacent to the nitrogen atom.

It is preferred that the hindered amine compound contains a plurality of piperidine rings having a substituent bonded to each of the two carbon atoms adjacent to the nitrogen atom. The piperidine ring preferably has, as a substituent bonded to the carbon atom adjacent to the nitrogen atom, an alkyl group, such as a methyl group or an ethyl group, more preferably has a methyl group bonded to each of the carbon atoms.

Examples of hindered amine compounds include N,N',N",N'"-tetrakis-{4,6-bis[butyl-(N-methyl-2,2,6,6-tetramethylpiperidin-4-yl)amino]-triazin-2-yl}-4,7-diazadecane-1,10-amine, a polycondensation product of dibutylamine, 1,3,5-triazine and N,N-bis(2,2,6,6-tetramethyl-4-piperidyl) butylamine, poly{[6-(1,1,3,3-tetramethylbutyl)amino-1,3,5-triazine-2,4-diyl][(2,2,6,6-tetramethyl-4-piperidyl)imino] hexamethylene[(2,2,6,6-tetramethyl-4-piperidyl)imino]}, a polycondensation product of 1,6-hexanediamine-N,N'-bis(2,2,6,6-tetramethyl-4-piperidyl) and morpholine-2,4,6-trichloro-1,3,5-triazine, high molecular-weight hindered amine compounds comprising a plurality of piperidine rings bonded through a triazine skeleton, such as poly{(6-morpholino-s-triazine-2,4-diyl)[(2,2,6,6-tetramethyl-4-piperidyl)imino]-hexamethylene[(2,2,6,6-tetramethyl-4-piperidyl)imino]}; and high molecular-weight hindered amine compounds comprising piperidine rings bonded through an ester linkage, such as a polymerization product of dimethyl succinate and 4-hydroxy-2,2,6,6-tetramethyl-1-piperidineethanol, and a mixed esterification product of 1,2,3,4-butanetetracarboxylic acid, 1,2,2,6,6-pentamethyl-4-piperidinol and 3,9-bis(2-hydroxy-1,1-dimethylethyl)-2,4,8,10-tetraoxaspiro[5,5]undecane.

Of these, an especially preferred hindered amine compound is poly{[6-(1,1,3,3-tetramethylbutyl)amino-1,3,5-triazine-2,4-diyl][(2,2,6,6-tetramethyl-4-piperidyl)imino]hexamethylene[(2,2,6,6-tetramethyl-4-piperidyl)imino]}.

Even when the hindered amine compounds represented by the same chemical formula or nomenclature, the compounds may have different light transmittances, or when the compounds are polymers, they possibly have different number average molecular weights or totally different properties.

With respect to the molecular weight of the hindered amine compound, there is no particular limitation, but it is preferably in the range of from 1,500 to 100,000, more preferably 1,500 to 10,000, and particularly preferably 1,500 to 5,000.

In the present invention, the molecular weight of the hindered amine compound comprised of a polymer is a number average molecular weight as measured by a gel permeation chromatography method using tetrahydrofuran as a solvent.

The molecular weight of the hindered amine compound can be controlled by changing the catalyst, reaction temperature, or reaction time.

It is preferred that the hindered amine compound has a light transmittance of 90% or higher.

In the present invention, the light transmittance of the hindered amine compound is a light transmittance at a wavelength of 400 nm as measured using a 5% by weight chloroform solution and a cell with an optical path of 10 mm. The light transmittance of the hindered amine compound can be improved by increasing the purity of the compound.

When the light transmittance and molecular weight of the hindered amine compound fall-in the above respective ranges, the transparency to blue laser is advantageously stable.

For example, commercially available poly{[6-(1,1,3,3-tetramethylbutyl)amino-1,3,5-triazine-2,4-diyl][(2,2,6,6-tetramethyl-4-piperidyl)imino]hexamethylene[(2,2,6,6-tetramethyl-4-piperidyl)imino]} having a molecular weight of 2,000 or more has a light transmittance of less than 90% or a light transmittance of 95%, and one having a higher light transmittance is preferred.

The amount of the hindered amine compound is preferably in the range of from 0.01 to 5 parts by weight, more preferably 0.03 to 2 parts by weight, and particularly preferably 0.05 to 1 part by weight, relative to 100 parts by weight of the alicyclic structure-containing polymer.

The releasing agent used in the present invention and the alicyclic structure-containing polymer as a base material satisfy the following relationship:

$$10 \geq |s1-s2| \geq 0.8 \ [(MPa)^{0.5}],$$

wherein s1 represents a solubility parameter of the releasing agent, and s2 represents a solubility parameter of the alicyclic structure-containing polymer.

Particularly, s1 and s2 preferably satisfy the relationship: $10 \geq |s1-s2| \geq 1$, more preferably satisfy the relationship: $5 \geq |s1-s2| \geq 1.2$. When $|s1-s2|$ is smaller than 0.8, the releasability is poor, and, when $|s1-s2|$ is larger than 10, the compatibility of the releasing agent with the alicyclic structure-containing polymer as a base material becomes poor to cause bleed-out or haze.

In the present invention, the solubility parameter (s1) of the releasing agent and the solubility parameter (s2) of the alicyclic structure-containing polymer are values determined using the "Method of Hoy" described in reference literature 1 shown below.

s1 of the releasing agent is a value of solubility parameter δt in the Hoy's equation determined by an equation (1), and s2 of the alicyclic structure-containing polymer is a value of solubility parameter δt in the Hoy's equation determined by an equation (2).

$$\delta t = (F_t + 277)/V \quad (1)$$

$$\delta t = (F_t + 277/n)/V \quad (2)$$

wherein $F_t$ represents a molar attractive force function, V represents a molar volume, and n represents the number of repeating units per effective segment of the polymer.

(Reference Literature 1) Polymer Hand Book 4th Edition, Van Kervern. 214, "Properties of Polymers"; Method of Hoy Examples of releasing agents include hydrocarbon releasing agents, such as paraffins, naphthenes, aromatic compounds, low-molecular polyethylene waxes, low-molecular polypropylene waxes, low-molecular polystyrene waxes, and oxides thereof and modified products with a carboxylic acid, a hydroxyl group, or an ester group; fatty acid releasing agents, such as lauric acid, myristic acid, palmitic acid, stearic acid, behenic acid, hydroxystearic acid, erucic acid, oleic acid, coconut oil fatty acid, phthalic acid, adipic acid, trimellitic acid, hydroxyheptadecanoic acid, hydroxyoctadecanoic acid, hydroxyeicosanoic acid, hydroxydocosanoic acid, hydroxyhexacosanoic acid, and hydroxytriacontanoic acid; alcohol releasing agents, such as glycerol, trimethylolpropane, pentaerythritol, diglycerol, triglycerol, dipentaerythritol, ethylene glycol, stearyl alcohol, 1,6,7-trihydroxy-2,2-di(hydroxymethyl)-4-oxoheptane, sorbitan, sorbitol, polyoxyethylene sorbitan, polyoxyethylene sorbitol, ethylene glycol, polyethylene glycol, propylene glycol, polyethylene glycol, 2-methyl-1,6,7-trihydroxy-2-hydroxymethyl-4-oxoheptane, 1,5,6-trihydroxy-3-oxohexane, hexadecanol, heptadecanol, octadecanol, decyltetradecanol, hexacosanol, triacontanol, 1,2-hexadecanediol, 2,3-heptadecanediol, 1,3-octadecanediol, and 1,2-decyltetradecanediol; aliphatic ester releasing agents, e.g., condensation products of the below fatty acid and an alcohol compound, such as glycerol stearate, butyl stearate, pentaerythritol monostearate, pentaerythritol distearate, pentaerythritol tristearate, pentaerythritol tetrastearate, 12-hydroxystearic triglyceride, 12-hydroxystearic stearyl alcohol, pentaerythritol tetra-12-hydroxystearate, ethylene glycol di-12-hydroxystearate, and propylene glycol di-12-hydroxystearate; fatty acid amide releasing agents, e.g., condensation products of the below fatty acid and ammonia or ethylenediamine, such as stearic acid amide, ethylenebisstearic acid amide, ethylenebisoleic acid amide, hexamethylenebisbehenic acid amide, N-stearylstearic acid amide, N-oleylstearic acid amide, ethylenebiscaprylic acid amide, ethylenebiscapric acid amide, ethylenebisslauric acid amide, ethylenebisisostearic acid amide, m-xylylenebisstearic acid amide, hexamethylenebisoleic acid amide, dioleyladipic acid amide, dioleylsebacic acid amide, and stearoylethyl stearate $(C_{17}H_{35}CONH(CH_2)_2 OCOC_{17}H_{35})$; fatty acid metallic soap releasing agents, e.g., metal salts of a metal and the below fatty acid, such as calcium stearate; and silicone releasing agents.

The releasing agent preferably has a 5% weight loss temperature of 250° C. or higher, more preferably 280° C. or higher, and particularly preferably 300° C. or higher.

In the present invention, the 5% weight loss temperature is a value as measured in a nitrogen gas atmosphere at a temperature elevation rate of 10° C./minute using a differential thermogravimeter (TG/DTA200 by Seiko Instruments Inc.).

When the 5% weight loss temperature falls in the above range, the molded body is advantageously unlikely to have poor appearance due to the adhesion of gas of the releasing agent to the mold, or bleeding or flash.

The releasing agent preferably has a molecular weight in the range of from 400 to 10,000, more preferably 500 to 5,000.

When the molecular weight of the releasing agent falls in the above range, it is easy to incorporate the releasing agent into the alicyclic structure-containing polymer as a base material, and the molded body is advantageously unlikely to have poor appearance due to the adhesion of gas of the releasing agent to the mold, or bleeding or flash.

The relative comparison in solubility parameter between the releasing agent and the alicyclic structure-containing polymer as a base material is important, and hence the selection of the releasing agent is not particularly limited, but preferred are hydrocarbon and fatty acid ester releasing agents, such as paraffin waxes, stearyl stearate, pentaerythritol distearate, pentaerythritol tristearate, pentaerythritol tetrastearate, 12-hydroxystearic triglyceride, and glycerol tristearate; and fatty acid amide releasing agents, such as N-stearylstearic acid amide, N-oleylstearic acid amide, ethylenebisstearic acid amide, hexamethylenebisbehenic acid amide, and ethylenebisoleic acid amide since they are less volatile.

Of these, more preferred are fatty acid amide releasing agents from the viewpoint of reducing the amount of the releasing agent incorporated, preventing contamination of the mold due to bleed-out and preventing haze or white turbidity of the molded body, and improving the resistance to blue laser, and especially preferred are ethylenebisstearic acid amide and hexamethylenebisbehenic acid amide.

With respect to the amount of the releasing agent, there is no particular limitation as long as it is such an amount that the effect of the present invention is not sacrificed, but the amount is preferably in the range of from 0.01 to 5 parts by weight, more preferably 0.03 to 3 parts by weight, and particularly preferably 0.05 to 2 parts by weight, relative to 100 parts by weight of the alicyclic structure-containing polymer. When the amount of the releasing agent falls in the above range, the releasability is advantageously improved and contamination of the mold due to bleed-out is prevented, and further haze of the molded body is prevented.

With respect to the color tone of the releasing agent, there is no particular limitation as long as the effect of the present invention can be obtained, but the color tone of the releasing agent can be selected so that the resin composition preferably has a light transmittance at a wavelength of 400 nm and an optical path length of 3 mm of 88% or higher, more preferably 89% or higher, and particularly preferably 90% or higher.

When the resin composition according to the present invention having a light transmittance in the above range is used in, for example, an optical lens, diffraction grating, or prism for semiconductor laser having a short oscillation wavelength (blue laser having a wavelength of 350 to 530 nm) or a short-wavelength light source LED, not only can high light transmission properties be obtained, but also discoloration or deformation due to abrasion caused by the poor transmission is advantageously unlikely to occur.

In the resin composition according to the present invention, an additional polymer component, such as a main-chain hydrogenated product of a styrene-butadiene-styrene block copolymer (styrene-ethylene-butylene-styrene block copolymer [SEBS]) or a main-chain hydrogenated product of a styrene-isoprene-styrene block copolymer (styrene-ethylene-propylene-styrene block copolymer [SEPS]), can be added in such an amount that the effect of the present invention is not sacrificed. The additional polymer component advantageously prevents the molded body from suffering haze at a high temperature at a high humidity.

The metal content of the additional polymer component is preferably 50 ppm or less, and particularly preferably 30 ppm or less.

The amount of the additional polymer component is preferably in the range of from 0.05 to 70 parts by weight, more preferably 0.1 to 50 parts by weight, and particularly preferably 0.15 to 0.3 part by mass, relative to 100 parts by weight of the alicyclic structure-containing polymer.

In the resin composition according to the present invention, for improving the mechanical properties, filler, such as glass fiber, carbon fiber, metal fiber, metal flake, glass beads, wollastonite, rock filler, calcium carbonate, talc, silica, mica, glass flake, milled fiber, kaolin, barium sulfate, graphite, molybdenum disulfide, magnesium oxide, zinc oxide whisker, and potassium titanate whisker, can be used individually or in combination.

Further, in the resin composition according to the present invention, an additive, such as a known antioxidant, a flame retardant, an anti-fungus agent, wood meal, a coupling agent, a plasticizer, a colorant, a lubricant, silicone oil, a foaming agent, a surfactant, or a releasing agent other than those mentioned above, can be incorporated in such an amount that the effect of the present invention is not sacrificed.

Examples of methods for producing the resin composition according to the present invention include a method in which the alicyclic structure-containing polymer, the hindered amine compound, the releasing agent, and an additive optionally added are kneaded with one another to obtain a resin composition in the form of pellets; and a method in which the alicyclic structure-containing polymer, the hindered amine compound, the releasing agent, and an additive optionally added are mixed together in an appropriate solvent and then the solvent is removed to obtain a resin composition.

In the kneading, a melt-kneading machine, such as a uniaxial extruder, a biaxial extruder, a Banbury mixer, a kneader, or a feeder ruder, can be used.

The kneading temperature is preferably in the range of from 200 to 400° C., more preferably 240 to 350° C.

In the kneading, the components can be either all added at the same time and kneaded together or kneaded while adding them portion by portion.

The resin composition according to the present invention has excellent releasability and excellent transparence and colorless property as well as excellent resistance to laser Especially, the resin composition having a light transmittance of 88% or higher at a wavelength of 400 nm and an optical path length of 3 mm is preferred from the viewpoint of obtaining a molded body having excellent resistance to laser.

From the resin composition according to the present invention, a molded body can be obtained using a known molding method, such as an injection molding method, a compression molding method, or an extrusion method. The form of the molded body can be appropriately selected depending on the use.

With respect to the conditions for molding, there is no particular limitation, but the molding is performed, for example, at a temperature of the resin being molded of generally 200 to 400° C., preferably 210 to 350° C. When using a mold, the molding is performed so that a mold temperature $t_0$ (° C.) and a glass transition temperature ti (° C.) of the alicyclic structure-containing polymer used generally satisfy: room temperature $<t_0<(t_1+15)$° C., preferably satisfy: $(t_1-30)<t_0<(t_1+10)$° C., more preferably satisfy: $(t_1-20)<t_0<(t_1+5)$° C.). (It is noted that, when $(t_1-30)<$room temperature or $(t_1-20°$ C.)$<$room temperature, room temperature$<t_0$ is applied). When the temperature of the resin being molded and the mold temperature fall in the above respective ranges, excellent releasability can be advantageously achieved.

On the surface of the molded body produced from the resin composition according to the present invention, a hard coat layer comprised of an inorganic compound, an organic silicon compound, such as a silane coupling agent, an acrylic resin, a vinyl resin, a melamine resin, an epoxy resin, a fluororesin, or a silicone resin can be formed.

When the hard coat layer is formed, the molded body can be improved in resistance to heat, optical properties, resistance to chemical, resistance to wear, and resistance to water.

Examples of methods for forming the hard coat layer include known methods, such as a heat curing method, an ultraviolet light curing method, a vacuum vapor deposition method, a sputtering method, and an ion plating method.

The resin composition according to the present invention is used in various molded bodies, and, with respect to the use of the composition, there is no particular limitation, but, the resin composition has excellent transparence and colorless property as well as excellent resistance to laser, and therefore can be used in, for example, diffraction grating; lenses, such as a pickup objective lens, a collimator lens, a camera lens, a telescope lens, and a laser beam fθ lens; optical discs, such as an optical video disc, an audio disc, a document file disc, and a memory disc; optical materials for optical film, such as OHP film; optical semiconductor encapsulation materials for photointerrupter, photocoupler, and LED lamp; encapsulation materials for IC memory, such as IC card; phase difference panel for liquid crystal display; light diffuser panel; light guide panel; deflecting plate protective film; collective sheet; and optical fiber.

Particularly, the resin composition can be preferably used in transparent molded bodies for use in apparatuses using blue laser, e.g., lenses, such as a pickup lens and a laser beam fθ lens; and optical discs, such as an optical video disc and a memory disc; and optical molded bodies, such as mirror, reflector device, and surface decoration.

EXAMPLES

Hereinbelow, the present invention will be described in detail with reference to the following Examples, which should not be construed as limiting the scope of the present invention. In the following Examples, "part(s)" is given by mass.

Reference Example 1

Synthesis of Vinylcycloalkane Polymer 76.8 Parts of styrene and 3.2 parts of isoprene were added to an autoclave made of stainless steel purged with nitrogen gas, and mixed together and stirred to prepare mixed monomers. 320 parts of dehydrated cyclohexane, 4 parts of the mixed monomers, and 0.1 part of dibutyl ether were then charged into an autoclave made of stainless steel having a magnetic stirrer and being purged with nitrogen gas, and 0.454 part of a hexane solution of n-butyllithium (concentration: 15%) was added while stirring at 50° C. to initiate polymerization, effecting the polymerization. After a lapse of 0.5 hour from the start of the polymerization (the polymerization conversion was about 96% at this point in time), 76 parts of the mixed monomers were continuously added over 1 hour. After a lapse of 0.5 hour from the completion of addition of the mixed monomers (the polymerization conversion was about 95% at this point in time), 0.1 part of isopropyl alcohol was added to terminate the reaction, obtaining a polymerization reaction solution having a styrene-isoprene random copolymer dissolved.

Next, to 400 parts of the thus obtained polymerization reaction solution was added 3 parts of a stabilized nickel hydrogenation catalyst E22U (by NIKKI CHEMICAL CO., LTD.; silica-alumina carrier having supported thereon 60% nickel) and they were mixed together to obtain a mixture, and the mixture was charged into an autoclave made of stainless steel having an electric heater and a magnetic stirrer. Hydrogen gas was fed into the autoclave, and a hydrogenation reaction was conducted for 6 hours while stirring and keeping the inside of the autoclave at 160° C. and 4.5 MPa. After completion of the hydrogenation reaction, the resultant reaction mixture was subjected to pressure filtration under a pressure of 0.25 MPa using a pressure filter (Funda Filter by Ishikawajima-harima Heavy Industries Co., Ltd.) having radiolite #800 as a filter bed to obtain a colorless and transparent solution containing an alicyclic structure-containing polymer. The ratio of the number of carbon-carbon double bonds to the total number of carbon-carbon bonds in the polymer was 0.02% or less. The polymer had a solubility parameter of 18.77(MPa) 0,5 determined by a calculation.

Example 1

To the colorless and transparent solution (100 parts in terms of the polymer solids) obtained in Reference Example 1 were added 0.1 part of poly{[6-(1,1,3,3-tetramethylbutyl) amino-1,3,5-triazine-2,4-diyl][(2,2,6,6-tetramethyl-4-piperidyl)imino]hexamethylene[(2,2,6,6-tetramethyl-4-piperidyl)imino]} having a molecular weight of 2,000 to 2,500 (and having a light transmittance of 97.0% at 400 nm as measured using a 5% by weight chloroform solution and a quartz cell with an optical path length of 10 mm) as a hindered amine compound, and 0.2 part of a main-chain hydrogenated product of a styrene-isoprene-styrene block copolymer (SEPS; styrene/isoprene weight ratio: 30/70; melt flow rate: about 70 g/minute (230° C., 2.16 kgf)) to dissolve them in the solution.

The resultant solution was subjected to filtration using a filter comprised of metal fiber (by NICHIDAI CO., LTD.; pore size: 0.5 μm). The filtrate was then subjected -to filtration using ZETA PLUS Filter 30S (by CUNO K.K.; pore size: 0.5 to 1 μm), and further subjected to filtration using a filter comprised of metal fiber (by NICHIDAI CO., LTD.; pore size: 0.2 μm) to remove foreign matter.

The resultant filtrate (polymer concentration: 20%) was heated to 250° C., and continuously fed to a cylindrical concentration dryer (by Hitachi, Ltd.) under a pressure of 3 MPa. The filtrate was concentrated while controlling the dryer so that the pressure in the concentration dryer was 60 kPa and the temperature of the polymer solution in a drying chamber was 260° C. The concentrated solution was then fed to another concentration dryer of the same type under a pressure of 1.5 MPa while keeping the solution at 260° C. The solvent was removed from the solution while controlling the dryer so that the pressure in the concentration dryer on the second stage was 1.5 kPa and the temperature of the polymer was 270° C. The polymer from which the solvent was removed was continuously withdrawn in a fused state from the concentration dryer, and extruded in a clean room of class 100 and cooled by water, followed by cutting by means of a pelletizer (OSP-2 by Osada Seisakusho Ltd.), thus obtaining pellets.

The pellets obtained were dissolved in chlorobenzene, and analyzed by gas chromatography (G-3000 by Hitachi, Ltd.; detection limit: 10 ppm). It was found that the pellets had a volatile content of 150 ppm. Separately, the pellets were dissolved in tetrahydrofuran, and subjected to gel permeation chromatography measurement to determine a molecular weight by comparing with the molecular weight of standard polystyrene, thus determining a weight average molecular weight (Mw) and a number average molecular weight (Mn). It was found that the Mw was 85,000 and the weight average molecular weight (Mw)/number average molecular weight (Mn) was 1.18. Further, it was found that the hydrogenation degree was almost 100% (the amount of the unhydrogenated aromatic vinyl monomer units was 0.01 mol % or less, based on the total amount of the unhydrogenated aromatic vinyl monomer units and the hydrogenated aromatic vinyl monomer units, and the amount of the unhydrogenated conjugated diene monomer units was 0 mol %, based on the total amount of the unhydrogenated conjugated diene monomer units and the hydrogenated conjugated diene monomer units) and the glass transition temperature (Tg) was 125° C. The pellets were dissolved in tetralin purified by filtration using a filter having a pore size of 0.2 μm to obtain a 1.5% solution, and the number of foreign matter particles having a size of 0.5 μm or more in the solution obtained was measured using a light scattering particle detector (KS-58 by RION Co., Ltd.). It was found that the number of the foreign matter particles was $2.1 \times 10^3$/g.

1.0 Part of 12-hydroxystearic acid triglyceride (solubility parameter: $19.85(MPa)^{0.5}$; 5% weight loss temperature: 356° C.) as a releasing agent was incorporated into the above-obtained pellets and kneaded by means of a biaxial extruder (TEM35B by Toshiba Machine Co., Ltd.; barrel temperature: 200° C.).

(Evaluation of Releasability)

The pellets containing the above releasing agent were molded using an injection molding machine (TUPARL TR100EH by Sodik Co., Ltd.) into a molded body having a lens form (diameter: 3.5 mm; R: 2.2 mm). Conditions for the molding were such that the resin temperature was 270° C., the mold temperature was 120° C., and the cycle time was 1 minute. The amount of the resin used per shot was 25 g.

The number of shots was counted until sticking in the mold occurred. The test was conducted with 600 shots at most. The larger the number of shots, the more excellent the releasability.

(Evaluation of Transmittance)

With respect to the 65×65×3 mm molded body obtained by molding under the same conditions, a light transmittance at a wavelength of 400 nm and an optical path length of 3 mm was measured.

(Evaluation of Transparence and Colorless Property)

With respect to the molded body used in the evaluation of transmittance, color tone of the side of 65 mm in the longitudinal direction was visually examined.

(Evaluation of Resistance to Laser)

The molded body was allowed to stand in a room at 60° C., and irradiated with blue laser at 40.5+10 nm and 200 mW/cm$^2$ using a laser diode (TC4030S-F405ASU by NEOARK Corporation) for 240 hours. The molded body which had been irradiated with the laser was visually examined while emitting intense light against the side.

The results of the evaluations of releasability, transmittance, transparence and colorless property, and resistance to laser are shown in Table 1.

Example 2

A molded body was obtained in substantially the same manner as in Example 1 except that the amount of the releasing agent added was changed to 0.5 part by weight, and evaluations of the releasability, transmittance, transparence and colorless property, and resistance to laser were made with respect to the molded body. The results of the evaluations are shown in Table 1.

Example 3

A molded body was obtained in substantially the same manner as in Example 1 except that the releasing agent was changed to 0.5 part by weight of pentaerythritol distearate (solubility parameter: $19.95(MPa)^{0.5}$; 5% weight loss temperature: 318° C.), and evaluations of the releasability, transmittance, transparence and colorless property, and resistance to laser were made with respect to the molded body. The results of the evaluations are shown in Table 1.

Example 4

A molded body was obtained in substantially the same manner as in Example 1 except that the releasing agent was changed to 0.5 part by weight of glycerol tristearate (solubility parameter: $18.57(MPa)^{0.5}$; 5% weight loss temperature: 365° C.), and evaluations of the releasability, transmittance, transparence and colorless property, and resistance to laser were made with respect to the molded body. The results of the evaluations are shown in Table 1.

Example 5

A molded body was obtained in substantially the same manner as in Example 1 except that the releasing agent was changed to 0.5 part by weight of ethylenebisstearic acid amide (solubility parameter: $19.89(MPa)^{0.5}$; 5% weight loss temperature: 324° C.), and evaluations of the releasability, transmittance, transparence and colorless property, and resistance to laser were made with respect to the molded body. The results of the evaluations are shown in Table 1.

Example 6

A molded body was obtained in substantially the same manner as in Example 6 except that the amount of the releasing agent incorporated was changed to 0.25 part by weight, and evaluations of the releasability, transmittance, transparence and colorless property, and resistance to laser were made with respect to the molded body. The results of the evaluations are shown in Table 1.

Example 7

A molded body was obtained in substantially the same manner as in Example 1 except that the releasing agent was changed to 0.25 part by weight of hexamethylenebisbehenic acid amide (solubility parameter: $19.46(MPa)^{0.5}$; 5% weight loss temperature: 361° C.), and evaluations of the releasability, transmittance, transparence and colorless property, and resistance to laser were made with respect to the molded body. The results of the evaluations are shown in Table 1.

Reference Example 2

Synthesis of Norbornene Polymer)

In a nitrogen gas atmosphere, to 20 parts by weight of ethyltetracyclododecene (hereinafter, abbreviated as "ETCD") were added 200 parts by weight of cyclohexane, 2 parts by weight of 1-hexene, 15 parts by weight of a toluene solution of triethylaluminum having a concentration of 15% by weight, and 5 parts by weight of triethylamine, and, while keeping the mixture at 20° C. and stirring it, 80 parts by weight of ETCD and 9 parts by weight of a toluene solution of titanium tetrachloride having a concentration of 20% by weight were continuously added over 60 minutes. A reaction was then effected for 1 hour, and then 5 parts by weight of ethyl alcohol and 2 parts by weight of water were added to terminate the reaction.

The reaction solution was heated to 40° C. to hydrolyze the catalyst, and then 3 parts by weight of calcium sulfate and 60 parts by weight of cyclohexane were added and excess water was removed. The resultant deposits containing a metal were removed by filtration to obtain 371 parts by weight of a transparent polymer solution containing an ETCD ring-opening polymer.

15 Parts by weight of an Ni-diatomaceous earth catalyst (N113 by NIKKI CHEMICAL CO., LTD.) was added to 750 parts by weight of the polymer solution obtained, and placed in a pressure reaction vessel and hydrogen gas was introduced to effect a hydrogen addition reaction under a pressure of 50 kg/cm² at temperature of 200° C. for 3 hours. After completion of the reaction, 700 parts by weight of cyclohexane was added to the reaction mixture and the catalyst was removed by filtration to obtain 1,350 parts by weight of a cyclohexane solution of an ETCD ring-opening polymer hydrogen addition product.

800 Parts by weight of the obtained cyclohexane solution of the ETCD ring-opening polymer hydrogen addition product was passed through a column having an inner diameter of 10 cm and a length of 100 cm and being packed with 4.5 parts by weight of activated alumina (NEOBEAD D by MIZUSAWA INDUSTRIAL CHEMICALS, LTD.) so that the retention time was 100 seconds, and allowed to circulate for 24 hours to obtain a colorless and transparent polymer solution. The ETCD ring-opening polymer hydrogen addition product had a solubility parameter of $18.77(MPa)^{0.5}$ determined by a calculation.

Example 8

To the colorless and transparent solution (100 parts in terms of the polymer solids) obtained in Reference Example 2 were added 0.1 part of poly{[6-(1,1,3,3-tetramethylbutyl)amino-1,3,5-triazine-2,4-diyl][(2,2,6,6-tetramethyl-4-piperidyl)imino]hexamethylene[(2,2,6,6-tetramethyl-4-piperidyl)imino]} having a molecular weight of 2,000 to 2,500 (and having a light transmittance of 97.0% at a wavelength of 400 nm as measured using a 5% by weight chloroform solution and a quartz cell with an optical path length of 10 mm) as a hindered amine compound, and 0.1 part of a main-chain hydrogenated product of a styrene-butadiene-styrene block copolymer (SEBS; styrene/isoprene weight ratio: 40/60; melt flow rate: about 0.8 g/minute (230° C., 2.16 kgf)) to dissolve them in the solution, and the resultant solution (polymer concentration: 20%) was heated to 260° C., and continuously fed to a cylindrical concentration dryer (by Hitachi, Ltd.) under a pressure of 3 MPa. The solution was concentrated while controlling the dryer so that the pressure in the concentration dryer was 60 kPa and the temperature of the polymer solution in a drying chamber was 270° C. The concentrated solution was then fed to another concentration dryer of the same type under a pressure of 1.5 MPa while keeping the solution at 270° C. The solvent was removed from the solution while controlling the dryer so that the pressure in the concentration dryer on the second stage was 1.5 kPa and the temperature of the polymer was 280° C. The polymer from which the solvent was removed was continuously withdrawn in a fused state from the concentration dryer, and extruded in a clean room of class 100 and cooled by water, followed by cutting by means of a pelletizer (OSP-2 by Osada Seisakusho Ltd.), thus obtaining pellets.

The ETCD ring-opening polymer hydrogen addition product had an limiting viscosity [η] of 0.4 dl/g as measured in decalin at 85° C., an Mw/Mn ratio of 2.1 as measured by GPC using toluene as a solvent and a calibration curve obtained from standard polystyrene, a hydrogen addition degree of 99.8% or more as measured by $^1$H-NMR before and after the hydrogen addition reaction, and a Tg of 140° C. as measured by DSC.

0.25 Part of ethylenebisstearic acid amide (solubility parameter: 19.89(MPa)$^{0.5}$; 5% weight loss temperature: 324° C.) as a releasing agent was incorporated into the above-obtained pellets and kneaded by means of a biaxial extruder (TEM35B by Toshiba Machine Co., Ltd.; barrel temperature: 220° C.) in the same manner as in Example 1.

A molded body was obtained in substantially the same manner as in Example 1 except that the conditions for injection molding were changed to those such that the resin temperature was 270° C. and the mold temperature was 130° C., and evaluations of the releasability, transmittance, transparence and colorless property, and resistance to laser were made with respect to the molded body. The results of the evaluations are shown in Table 1.

Comparative Example 1

A molded body was obtained in substantially the same manner as in Example 1 except that the hindered amine compound was changed to poly{[6-(1,1,3,3-tetramethylbutyl) amino-1,3,5-triazine-2,4-diyl][(2,2,6,6-tetramethyl-4-piperidyl)imino]hexamethylene[(2,2,6,6-tetramethyl-4-piperidyl)imino]} having a molecular weight of about 2,500 (and having a light transmittance of 89.0% at a wavelength of 400 nm as measured using a 5% by weight chloroform solution and a quartz cell with an optical path length of 10 mm), and that the releasing agent was changed to a paraffin wax (LUVAX-1211 by NIPPON SEIRO CO., LTD.; solubility parameter: 17.85(MPa)$^{0.5}$; 5% weight loss temperature: 357° C.), and evaluations of the releasability, transmittance, transparence and colorless property, and resistance to laser were made with respect to the molded body. The results of the evaluations are shown in Table 1.

Comparative Example 2

A molded body was obtained in substantially the same manner as in Example 1 except that the releasing agent was changed to behenyl behenate (UNISTER M2222SL by NOF CORPORATION; solubility parameter: 18.50(MPa)$^{0.5}$; 5% weight loss temperature: 298° C.), and evaluations of the releasability, transmittance, transparence and colorless property, and resistance to laser were made with respect to the molded body. The results of the evaluations are shown in Table 1.

Comparative Example 3

A molded body was obtained in substantially the same manner as in Example 1 except that the releasing agent was changed to triethylene glycol (solubility parameter: 28.31 (MPa)$^{0.5}$; 5% weight loss temperature: 240° C. or lower), and evaluations of the releasability, transmittance, transparence and colorless property, and resistance to laser were made with respect to the molded body. The results of the evaluations are shown in Table 1.

TABLE 1

| | Polymer | |s1 − s2| | Transmittance | Transparence and colorless property | Releasability | Resistance to laser (haziness) |
|---|---|---|---|---|---|---|
| Example 1 | Reference Example 1 | 2.09 | 90% | Colorless and transparent | 372 | No haziness |
| Example 2 | | 2.09 | 90% | Colorless and transparent | 230 | No haziness |
| Example 3 | | 2.19 | 90% | Colorless and transparent | 450 | No haziness |
| Example 4 | | 0.81 | 90% | Colorless and transparent | 210 | No haziness |
| Example 5 | | 2.13 | 90% | Colorless and transparent | 600 | No haziness |
| Example 6 | | 2.13 | 90% | Colorless and transparent | 600 | No haziness |
| Example 7 | | 1.70 | 90% | Colorless and transparent | 600 | No haziness |
| Example 8 | Reference Example 2 | 1.12 | 89% | Colorless and transparent | 600 | Slightly hazy |
| Comparative Example 1 | Reference Example 3 | 0.09 | 87% | Slightly yellow | 124 | hazy |
| Comparative Example 2 | | 0.74 | 90% | Colorless and transparent | 150 | No haziness |
| Comparative Example 3 | | 10.54 | 80% | Yellow | 600 | hazy |

From Table 1, the following findings are obtained.

The resin composition (Examples 1 to 8), which comprises an alicyclic structure-containing polymer, a hindered amine compound, and a releasing agent, wherein the solubility parameter (s1) of the releasing agent and the solubility parameter (s2) of the alicyclic structure-containing polymer satisfy the relationship: $10 \geq |s1-s2| \geq 0.8$ $[(MPa)^{0.5}]$, has excellent releasability for molding as well as excellent transparence and colorless property and excellent resistance to laser of the molded body.

On the contrary, the resin composition (Comparative Examples 1 and 2), wherein the solubility parameter (s1) of the releasing agent and the solubility parameter (s2) of the alicyclic structure-containing polymer satisfy the relationship: $|s1-s2|<0.8$ $[(MPa)^{0.5}]$, has poor releasability, poor transparence and colorless property, and poor resistance to laser.

The resin composition (Comparative Example 3), which comprises an alicyclic structure-containing polymer, a hindered amine compound, and a releasing agent, wherein the solubility parameter (s1) of the releasing agent and the solubility parameter (s2) of the alicyclic structure-containing polymer satisfy the relationship: $10<|s1-s2|[(MPa)^{0.5}]$, has poor transparence and colorless property and poor resistance to laser.

INDUSTRIAL APPLICABILITY

The resin composition according to the present invention is used in a variety of molded bodies. The resin composition can be used as, for example, a diffraction grating; lenses, such as a pickup objective lens, a collimator lens, a camera lens, a telescope lens, or a laser beam fθ lens; optical discs, such as an optical video disc, an audio disc, a document file disc, or a memory disc; optical materials for optical film, such as OHP film; optical semiconductor encapsulation materials for photointerrupter, photocoupler, or LED lamp; an encapsulation material for IC memory, such as IC card; a phase difference panel for liquid crystal display; a light diffuser panel; a light guide panel; a deflecting plate protective film; or a collective sheet. Particularly, the resin composition is preferably used in the formation of transparent molded bodies for use in apparatuses using blue laser, e.g., lenses, such as a pickup lens and a laser beam fθ lens; and optical discs, such as an optical video disc and a memory disc.

The invention claimed is:

1. A resin composition comprising:
   an alicyclic structure-containing polymer;
   a hindered amine compound; and
   a releasing agent,
   wherein the releasing agent and the alicyclic structure-containing polymer satisfy the following relationship:

$$10 \geq |s1-s2| 0.8[(MPa)^{05}],$$

wherein s1 represents a solubility parameter of the releasing agent, and s2 represents a solubility parameter of the alicyclic structure-containing polymer.

2. The resin composition according to claim 1, wherein the alicyclic structure-containing polymer is obtained by hydrogenating an aromatic vinyl polymer in which a content of an aromatic vinyl monomer unit is 50% by weight or more.

3. The resin composition according to claim 1, wherein the ratio of the number of carbon-carbon double bonds to the total number of carbon-carbon bonds in the alicyclic structure-containing polymer is 0.15% or less.

4. The resin composition according to claim 1, wherein the hindered amine compound has (1) a molecular weight in the range of from 1,500 to 100,000, and (2) a light transmittance of 90% or more at a wavelength of 400 nm as measured using a 5% by weight of chloroform solution and a cell with an optical path of 10 mm.

5. The resin composition according to claim 1, wherein the releasing agent is a fatty acid amide releasing agent.

6. The resin composition according to claim 1, wherein the resin composition has a light transmittance of 88% or more at a wavelength of 400 nm and an optical path length of 3 mm.

7. A molded body obtained by molding the resin composition according to claim 1.

* * * * *